United States Patent [19]

Haire et al.

[11] Patent Number: 5,338,050
[45] Date of Patent: Aug. 16, 1994

[54] CONVERTER DOLLY FOR PERMITTING BACKING UP OF TANDEM TRAILERS

[75] Inventors: Darrell Haire; Andrew R. Haire, both of Thomasville, N.C.

[73] Assignee: A.M. Haire Truck Bodies, Inc., Thomasville, N.C.

[21] Appl. No.: 887,346

[22] Filed: May 21, 1992

[51] Int. Cl.[5] .......................................... B62D 53/04
[52] U.S. Cl. ............................. 280/476.1; 280/482; 280/407
[58] Field of Search ............... 280/476.1, 408, 411.1, 280/412, 482, 423.1, 407, 446.1, 477

[56] References Cited

U.S. PATENT DOCUMENTS

| | | | |
|---|---|---|---|
| 2,309,204 | 1/1943 | Nelson | 280/33.5 |
| 2,344,921 | 3/1944 | McDaniel | 280/33.4 |
| 2,376,001 | 5/1945 | Nogel | 280/33.4 |
| 2,495,943 | 1/1950 | Peterson | 280/476.1 |
| 2,590,962 | 4/1952 | Gurton | 280/33.5 |
| 2,639,159 | 5/1953 | Milligan | 280/33.44 |
| 2,816,776 | 12/1957 | Nimtz | 280/423 |
| 3,556,560 | 1/1971 | Adams | 280/476.1 |
| 3,827,723 | 8/1974 | Neff et al. | 280/476.1 |
| 3,963,265 | 6/1976 | Kornoelje et al. | 280/432 |
| 4,119,330 | 10/1978 | Capps | 280/432 |
| 4,120,514 | 10/1978 | Sanders | 280/432 |
| 4,162,082 | 7/1979 | Curry | 280/476.1 X |
| 4,230,335 | 10/1980 | Glassmeyer | 280/476.1 |
| 4,365,820 | 12/1982 | Rush | 280/411 |
| 4,556,232 | 12/1985 | Sever | 280/432 |
| 4,573,699 | 3/1986 | Smith | 280/432 |
| 4,611,821 | 9/1986 | Jeanson et al. | 280/476.1 X |
| 4,775,165 | 10/1988 | Grovum | 280/432 |
| 4,930,800 | 6/1990 | Jean-Luc | 280/476.1 X |
| 4,993,737 | 2/1991 | Torcomian | 280/476.1 X |
| 5,098,115 | 3/1992 | Haire et al. | 280/476.1 |

*Primary Examiner*—Margaret A. Focarino
*Assistant Examiner*—C. Mattix
*Attorney, Agent, or Firm*—Bell, Seltzer, Park & Gibson

[57] ABSTRACT

A converter dolly comprising telescopic hitch means for adjusting the length between a first and second wheeled vehicle. The second wheeled vehicle having a kingpin projecting from an underside of the second wheeled vehicle in tandem comprising, a frame including a base portion and a telescoping hitch means comprising a tongue portion extending forwardly from the base portion. The tongue portion comprises a longitudinally extending, substantially rigid adjusting member and a mating member longitudinally slidably engaging the adjusting member. A hitch means carried by the mating member for pivotally connecting the converter dolly to the first vehicle about a first substantially vertical axis.

24 Claims, 2 Drawing Sheets

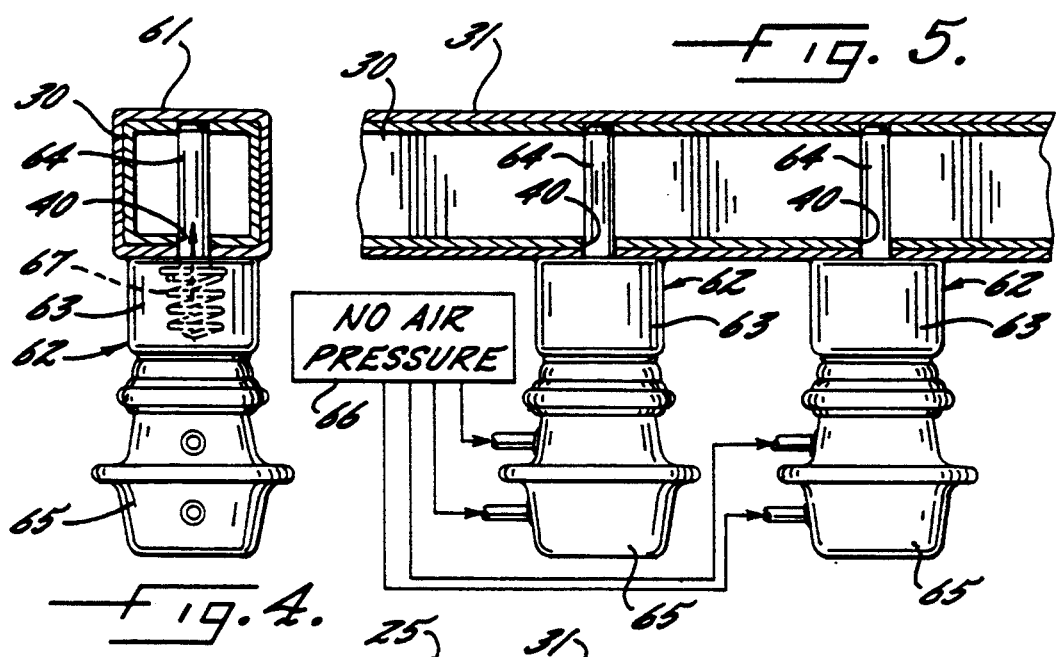
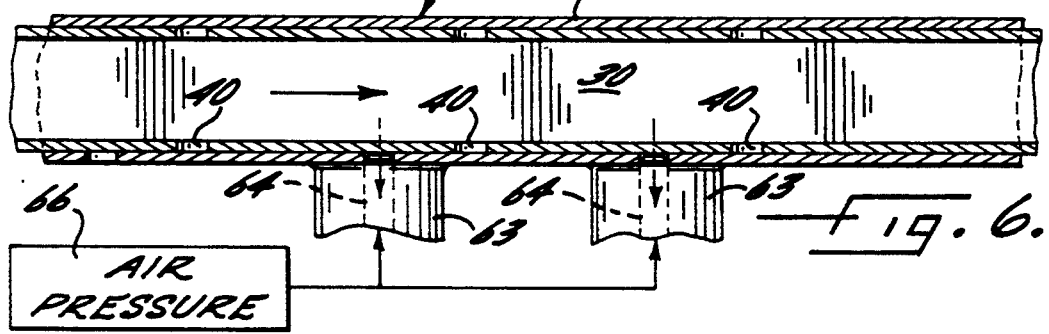
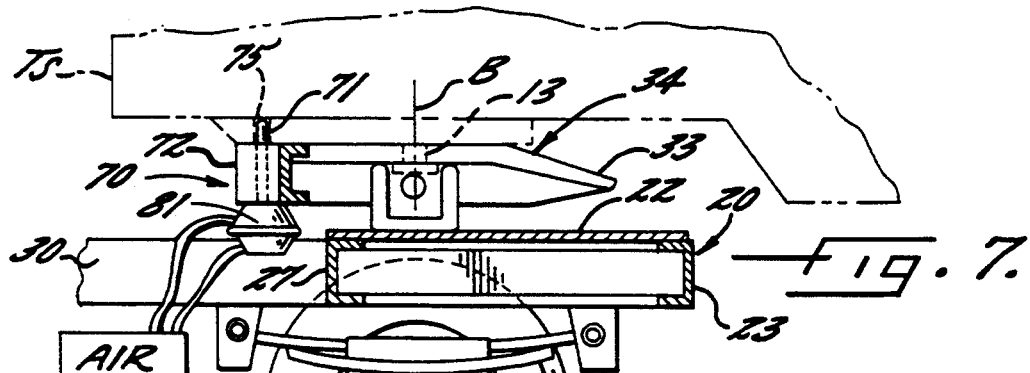
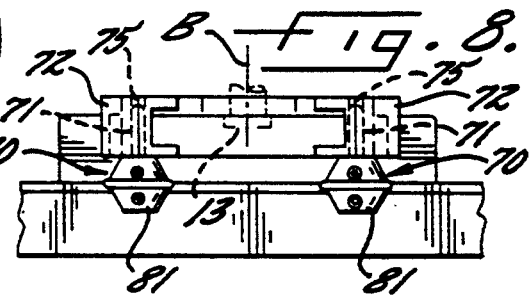

CONVERTER DOLLY FOR PERMITTING BACKING UP OF TANDEM TRAILERS

FIELD AND BACKGROUND OF THE INVENTION

The present invention relates to tandem trailers and the difficulties encountered in improving the highway economy performance of these tandem trailers while maintaining sufficient maneuverability for city driving. A further aspect of the present invention relates to backing up these trailers.

Over the past few years, the use of tandem trailers has become popular and more are used on the road than ever before. The tandem arrangement permits a single truck to double its hauling capability. This is particularly important in the moving industry wherein it is desirable to move furniture in one trailer and move an automobile in the second trailer, whereas in the past the automobile either had to be driven to the destination or towed behind the first trailer.

In operation, the first trailer is connected to the tractor using a fifth wheel and kingpin arrangement commonly known in the art. Alternatively, the first vehicle may be a straight truck rather than a tractor connected to the first trailer by a dolly including a fifth wheel. The second trailer is conventionally attached to the first trailer using a dolly carrying a second fifth wheel. This arrangement does not significantly increase the cost to pull the two trailers and there is little or no loss in maneuverability so long as the tractor and trailers are traveling in a forward direction.

A problem with such tandem arrangements is that the gap between the first and second vehicle results in decreased aerodynamics which affects fuel economy at high speeds such as on highways. If the two vehicles are attached too closely, the first and second trailer will interfere with each other during turning maneuvers such as those encountered in city driving. Highways are constructed without any tight turns, allowing a much smaller turning capacity to be acceptable. However, tandem trailer assemblies must operate both on highways and in cities so a greater gap has conventionally been used to meet the minimum requirements for city operation.

An additional problem occurs when the driver of the tractor desires to back up the trailers such as when delivering or picking up a load. The trailers must be disconnected from one another and backed up separately. This is due to the arrangement of pivot points between the tandem trailers and between the front trailer and tractor. When the tractor and trailers are traveling forward there are three pivot points about which the tractor and trailers pivot, namely a pivot point between the tractor and the first trailer, a pivot point between the first trailer and the dolly, and a pivot point between the converter dolly and the second trailer. This arrangement permits the driver to make smaller radius turns, but does not permit the tractor to be backed up without disconnecting the trailers from each other. This is impractical because connecting and disconnecting the trailers every time the trailer needs to be backed up is time consuming and thus expensive to do.

SUMMARY OF THE INVENTION

In accordance with the present invention, applicants provide a converter dolly for connecting a first wheeled vehicle and a second wheeled vehicle having a kingpin projecting from an underside of the second wheeled vehicle in tandem. The converter dolly includes a frame including a base portion and a telescoping hitch means comprising a tongue portion extending forwardly from the base portion. The tongue portion comprises a longitudinally extending, substantially rigid adjusting member and a mating member longitudinally slidably engaging the adjusting member. The converter dolly further includes a hitch means carried by the mating member for pivotally connecting the converter dolly to the first vehicle about a first substantially vertical axis; ground engaging wheels carried by the frame; a fifth wheel fixed on the base portion of the frame having a longitudinal slot formed therein and adjacent to its front end and receiving the second vehicle kingpin to interconnect the converter dolly to the second vehicle to permit pivotal movement of the second vehicle relative to the dolly about a second substantially vertical axis; and length locking means cooperating with the adjusting member and the mating member for preventing longitudinal movement of the mating member with respect to the adjusting member when the locking means is engaged. The distance between the first substantially vertical axis and the second substantially vertical axis can be adjusted to a desired length and then locked. The mating member may be locked in its retracted position to provide improved aerodynamic performance while traveling on highways and locked in its extended position to provide greater maneuverability while traveling on city streets.

The present invention further provides a converter dolly for connecting tandem trailers which eliminates the problem of having to disconnect the trailers from one another when it is desired to back up the trailers. The converter dolly is adapted to be coupled to the rear of a first trailer for pivotal movement about a substantially vertical axis. The dolly comprises a wheeled frame, telescoping hitch means as described previously, a fifth wheel carried by the wheeled frame and having means for coupling the first trailer to a second trailer for pivotal movement about a substantially vertical axis, and locking means cooperating with the fifth wheel. The locking means includes means movable between a retracted, inactive position for permitting pivotal movement of the second trailer about the vertical axis during normal driving operations and an extended, active position for engagement with the second trailer to restrain the second trailer against pivotal movement about the axle during backing up of the trailer. This maintains a fixed relationship between the second trailer and the dolly and thereby obviates the need for disconnecting the trailers from one another when backing up the tandem trailer assembly.

BRIEF DESCRIPTION OF THE DRAWINGS

The foregoing and other objects, features and advantages of the present invention will be made apparent from the following detailed description of the preferred embodiment of the invention, and from the drawings, in which:

FIG. 4 is an end view of a length locking means in accordance with the present invention;

FIG. 5 is a side view of a length locking means in accordance with the present invention in an embodiment using two motor means and pins;

FIG. 6 is a cutaway side view showing the longitudinal motion direction of the adjusting member and the mating member of the present invention;

FIG. 7 is an enlarged side elevation view of the backup lock means and fifth wheel of the present invention illustrating the converter dolly connected to the second trailer; and FIG. 8 is an elevation view of the backup locking means on the fifth wheel of the present invention.

DETAILED DESCRIPTION OF THE INVENTION

Figure 1:
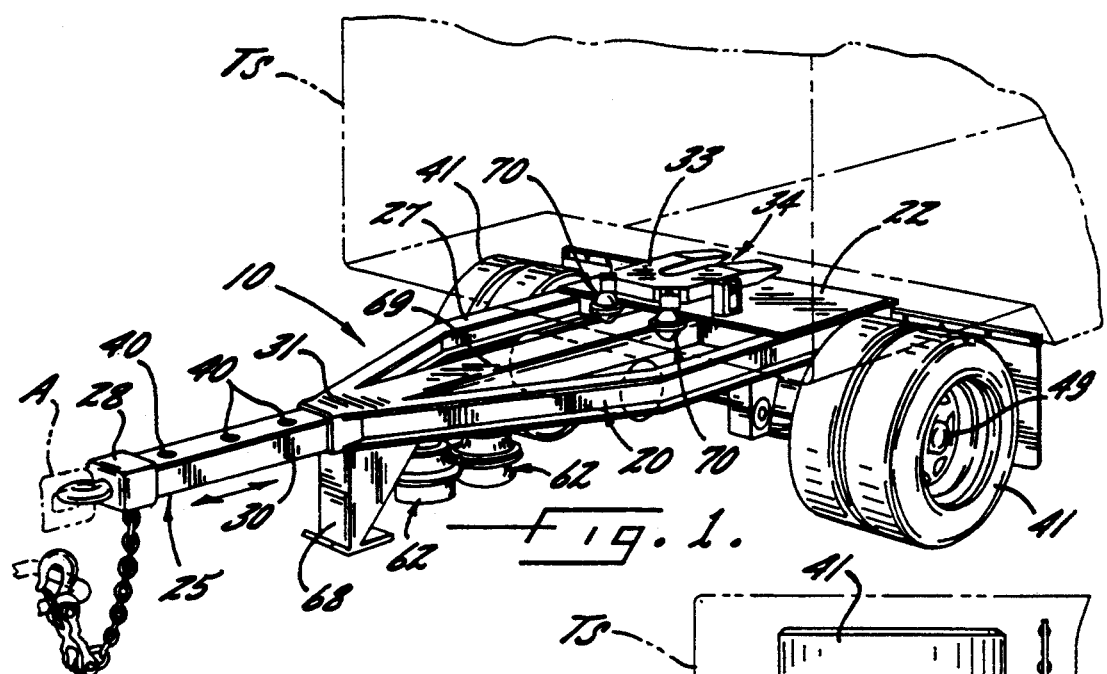
FIG. 1 is a perspective view of a trailer and the converter dolly of the present invention connecting the trailer to first hitch means of a first vehicle.

The present invention will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

As illustrated in FIGS. 1-4, a converter dolly is generally indicated by the reference numeral 10, and the dolly 10 interconnects a front first wheeled vehicle or trailer $T_f$ and a rear second trailer $T_s$. This tandem trailer assembly is pulled by a truck tractor (not shown). The first trailer can be connected to the tractor using a fifth wheel and kingpin arrangement commonly known in the art or the first trailer can be integral with the tractor chassis as in a straight truck.

The converter dolly 10 is especially suited for use on both highway and city roads because of its adjustable length. By extending the length of the converter dolly 10 to an extended position as shown in solid lines in FIG. 3, the tandem trailor assembly has increased turning manueverability because the first wheeled vehicle $T_f$ does not contact the second trailer $T_s$ during turning. By retracting the length of the converter dolly 10 to a retracted position as shown in phantom lines in FIG. 3, the tandem trailor assembly is shortened and has improved aerodynamics while traveling at high speeds such as on highways. This adjustment may also be used to meet varying overall length limitations on tractor trailer assemblies when traveling through different states.

Figure 2:
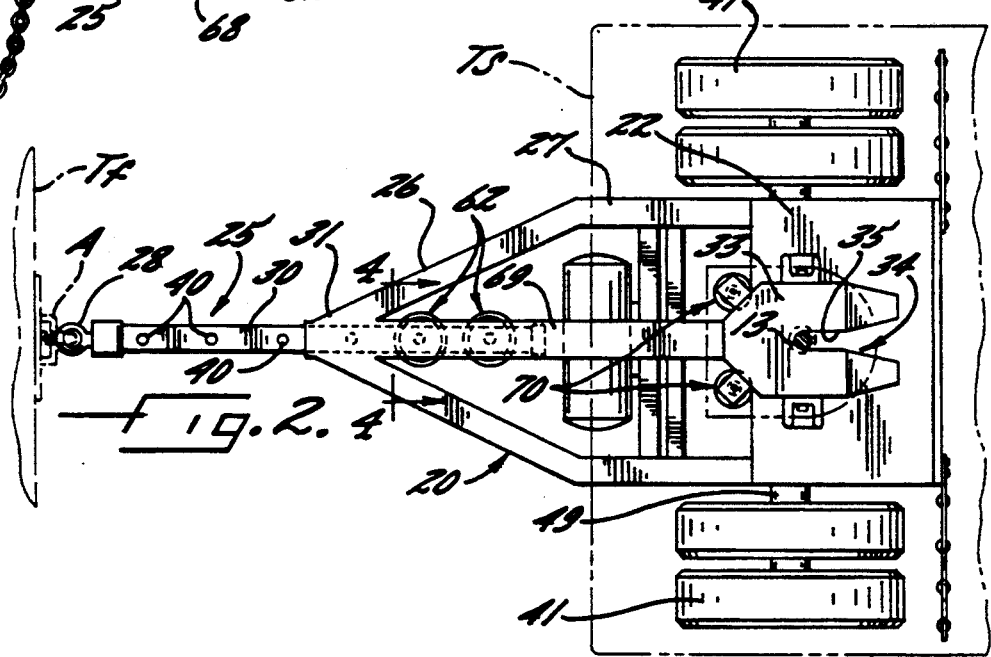
FIG. 2 is a top view of a trailer and the converter dolly of the present invention connecting the trailer to first hitch means of a first vehicle.
Figure 3:
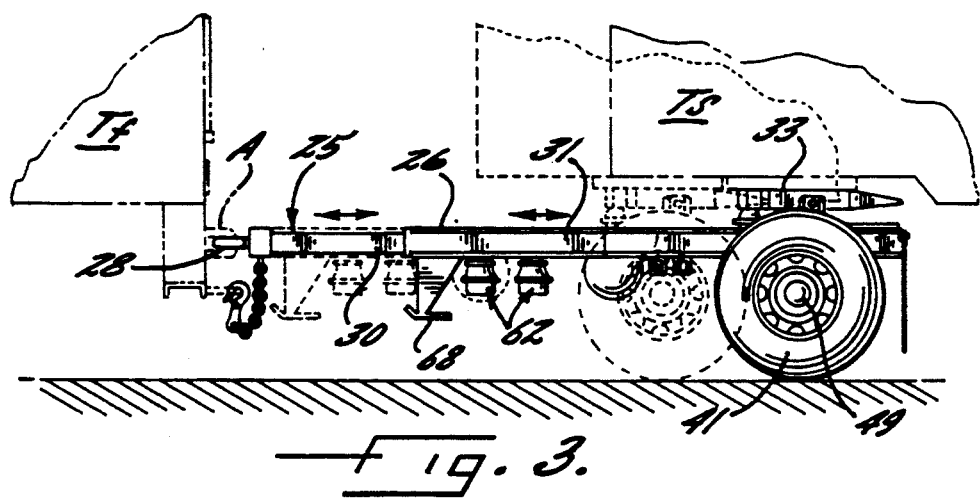
FIG. 3 is a side view of a first wheeled vehicle and a second trailer vehicle and the converter dolly of the present invention connecting them showing the tongue portion extended in solid lines and retracted in phantom lines.

An embodiment of the present invention is illustrated in FIGS. 1-3. The converter dolly 10 connects a first wheeled vehicle $T_f$ and a second wheeled vehicle $T_s$. The second wheeled vehicle has a kingpin 13 projecting from an underside of the second wheeled vehicle $T_s$. The converter dolly 10 comprises, a wheeled frame 20 including a base portion 22 and a telescoping hitch tongue 25 including a tongue portion 26 extending forwardly from the base portion 22.

A fifth wheel 33 is carried by the wheeled frame 20 and includes means for coupling the wheeled frame 20 to the rear second trailer $T_s$ for pivotal movement about a second vertical axis at point B. The means for coupling preferably includes a plate portion having a longitudinal slot 34 formed centrally therein and adjacent to its front end. A kingpin 13 projecting from a bearing plate 36 located on the underside of the second trailer $T_s$ is received in the longitudinal slot 34 and is locked therein at point B in a manner well understood in the art.

The tongue portion 26 comprises a longitudinally extending substantially rigid inner shaft 30 or other mating member and a longitudinally extending outer shaft 31 or other adjusting member longitudinally slidably engaging said longitudinally extending inner shaft 30. Preferably the longitudinally extending inner shaft 30 is slidably mounted within the outer shaft 31. An underside of inner shaft 30 preferably includes a plurality of longitudinally spaced aperatures 40. A hitch 28 or other first hitch means and a fifth wheel 33 or other second hitch means are connected to opposing ends of the tongue portion 20 for pivotally connecting one end of the telescoping hitch tongue to each of the first and second vehicles. The hitch 28 such as a ball coupling, ball socket or pintel hook arrangement is commonly known in the art, and is carried by inner shaft 30 for pivotally connecting the converter dolly 10 to the first vehicle about a first substantially vertical axis A. The fifth wheel 33 is fixed on base portion 22 of frame 20.

A length locking means 62 cooperates with inner shaft 31 and outer shaft 30 for preventing longitudinal movement of inner shaft 30 with respect to outer shaft 31 when locking means 62 is engaged as illustrated in FIGS. 4 and 5. The distance between first substantially vertical axis A and second substantially vertical axis B can be adjusted to a desired length and then locked.

An embodiment of the length locking means 62 is further illustrated in FIGS. 4 and 5. The length locking means includes a length locking pin housing 63 connected to the converter dolly, a length locking pin 64 positioned in housing 63 and moveable therein from a retracted to an extended position with the extended position illustrated in FIGS. 4 and 5 and the retracted position illustrated in FIG. 6. A length locking motor means 65 is operatively connected to housing 63 and cooperates with length locking pin 64 to move length locking pin 64 between a retracted position wherein inner shaft 30 may be longitudinally slidably located along outer shaft 31 and an extended position wherein longitudinal movement of inner shaft 30 along outer shaft 31 is prevented. The length locking pin 64 is received in aperture 40 when the pin is in the extended position in engagement with inner shaft 30 to prevent movement of inner shaft 30 within outer shaft 31. In the embodiment illustrated two locking motor means are illustrated but it is to be understood that the benefits of the present invention may be obtained with only a single length locking motor and pin means.

Length locking means 62 preferably further includes a length locking control means operatively connected to the length locking motor means for retracting and extending the length locking pin means. Length locking means 62 preferably comprises a pneumatic system including a diaphragm in communication with an air pressure source 66. The length locking control means for the pneumatic system may be remotely actuated and may be installed for convenience in the cab of the tractor. Length locking means 62 most preferably further includes a spring means 67 (FIG. 4) operatively connected to the length locking pin means for maintaining length locking pin 64 in an extended position when no power is being applied to length locking motor means 65 as illustrated in FIGS. 4 and 5.

Converter dolly 10 preferably further comprises a protection means 68 connected to the converter dolly for preventing damage to length locking means 62 while the converter dolly is in motion from loose debris or obstacles on the ground such as railroad tracks and speed bumps. The protection means also prevents the weight of the converter dolly from resting on the length locking means when it is unhitched from the first vehicle. Protection means 68 is preferably a substantially vertical plate connected to outer shaft 31 adjacent length locking means 62. The converter dolly also preferably includes a travel limit means 69 carried by the converter dolly for preventing inner shaft 30 from being completely removed from outer shaft 31. The travel limit means 69 may be a plate mounted to the end of inner shaft 30 which strikes an adjacent portion of outer shaft 31 when tongue portion 26 is in its fully extended position.

In operation, the telescoping hitch means 25 is normally in the retracted position during loading and city driving. When the driver of the tandem trailer assembly wishes to switch to highway driving the tandem trailer assembly is brought to a full stop, preferably in a parking area. The brakes on the second trailer vehicle are then engaged. The length locking motor means 65 is then activated to retract the length locking pin 64. The first vehicle is then inched slightly forward to take the length locking pin 64 out of alignment with the mating member aperature 40. The length locking motor means 65 is then deactivated and the spring means 67 presses the length locking pin 64 into contact with the inner shaft 30. The first vehicle is then moved forward slowly until the length locking pin 64 aligns with and engages in the desired aperature 40 in the inner shaft. This process may be repeated to move to other lengthened positions or to return the hitch tongue means 25 to the retracted position by reversing the direction of motion of the first vehicle. When the length locking control means is located in the driver cab this operation may be performed without requiring the driver to leave the first vehicle.

The dolly is particularly suited for use to facilitate backing up the trailers together without disconnecting them using locking means 70. This embodiment is more particularly illustrated in FIGS. 2, 7-8. The converter dolly comprises a wheel frame 20, a fifth wheel 33 carried by the wheeled frame 20 and a locking means 70 cooperating with the fifth wheel 33. The wheeled frame includes a base portion 22 fabricated of spaced apart metal bars 27, and the tongue portion 26 carrying the hitch means 28. The wheeled frame 20 is mounted on one or more ground engaging wheels 41 carried by an axle 49.

The locking means 70 preferably includes a pair of pins 71 in housings 72 which is carried by the fifth wheel 33 so that when the fifth wheel 33 pivots up or down, the pins 71 and housing 72 will move as a unit with the fifth wheel 33. This prevents the pins 71 from being sheared off or broken due to the pins staying in a fixed position relative to the fifth wheel when the fifth wheel pivots, creating a shear force against the pins. The pins 71 are movable between a retracted inactive position in apertures 73 in the housing 72 to an extended active position. When the pins 71 are extended to the active position, they are received in apertures 75 located in the underside of the second trailer $T_s$, and preferably as illustrated received in apertures located in the bearing plate 36 of the second trailer $T_s$. The retracted inactive position permits pivotal movement of the second trailer $T_s$ about an axis during normal driving operations of the tractor and trailers in a forward direction, whereas the extended active position restrains the second trailer $T_s$ against pivotal movement during backing up of the trailers.

The pin may be extended by motor means such as a fluid powered motor using pneumatic or hydraulic methods known in the art. A preferred method as shown in the figures is to use a pneumatic system cooperating with the pins 71 wherein a diaphragm 81, in communication with an air pressure source 82, moves the pins 71 pneumatically to the extended and locked position. The control means for the pneumatic system may be remotely actuated and may be installed for convenience in the cab of the tractor.

In operation when the driver desires to travel in a backward direction, he remotely actuates the control means to engage the diaphragm 81 to extend the pins 71 to an active position and the pins are received in apertures 75 of the underside bearing plate 36. This restrains the second trailer against pivotable movement about an axis during backing up and maintains a fixed relationship between the second trailer $T_s$ and the dolly 10. The tandem trailers can now be backed up without disconnecting the trailers. This arrangement also has a minimal amount of "cheat" or sliding of the wheels sideways when the trailers are being backed up around the corner, thus the driver may accurately back the trailer up.

While particular embodiments of the invention have been described, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

That which is claimed is:

1. A converter dolly comprising a telescoping hitch tongue for connecting a first wheeled vehicle and a second wheeled vehicle in tandem comprising a tongue portion having a longitudinally extending outer shaft and a longitudinally extending inner shaft slidably mounted within said outer shaft, said tongue portion further having a first end portion and a second end portion opposite said first end portion wherein the distance between said first end portion and said second end portion is adjustable by longitudinally moving said inner shaft within said outer shaft; a first hitch means connected to said first end portion for pivotally connecting said tongue portion to a first wheeled vehicle; a second hitch means connected to said second end portion for pivotally connecting said tongue portion to a second wheeled vehicle; and a length locking means connected to said tongue portion for preventing longitudinal movement of said inner shaft within said outer shaft when said length locking means is engaged, said length locking means including a length locking pin housing connected to said outer shaft, a length locking pin positioned in said housing and moveable therein from a retracted to an extended position, and length locking motor means operatively connected to said housing and cooperating with said length locking pin to move said length locking pin between a retracted position for permitting movement of said inner shaft within said outer shaft and an extended position in engagement with said inner shaft for preventing movement of said inner shaft within said outer shaft, said length locking motor means further includes a spring means operatively connected to said length locking pin for maintaining said length locking pin in said extended position when no power is being applied to said length locking motor means; wherein said converter dolly comprising said hitch tongue is a free-standing structure and is removable from said vehicles and may be used with other wheeled vehicles.

2. A telescoping hitch tongue according to claim 1 further comprising a protection means connected to said converter dolly for preventing damage to said length locking motor means while the first and second wheeled vehicles in tandem are in motion from loose debris or obstacles on the ground.

3. A telescoping hitch tongue according to claim 1 further comprising a travel limit means carried by said converter dolly for preventing said inner shaft from being completely removed from said outer shaft.

4. A telescoping hitch tongue according to claim 1 wherein an underside of said inner shaft includes a plurality of longitudinally spaced apertures for receiving said length locking pin when said length locking pin is in an extended position in engagement with said inner shaft for preventing movement of said inner shaft.

5. A converter dolly according to claim 1 wherein said second hitch means further comprises a locking mechanism to selectively limit any pivotable movement between said hitch tongue and said second vehicle.

6. A tandem trailer assembly comprising: a first wheeled vehicle; first hitch means carried by the rearmost portion of said first vehicle; a second wheeled vehicle positioned in tandem behind said first vehicle; and including a coupling member comprising a kingpin projecting from an underside of said second vehicle and a converter dolly positioned between and interconnecting said first and second vehicles, such that said second vehicle is pivotally connected to said converter dolly, said converter dolly comprising a frame including a base portion and a tongue portion extending forwardly from said base portion, said tongue portion having a longitudinally extending outer shaft and longitudinally extending inner shaft slidably mounted within said outer shaft, said inner shaft having an extended position and a retracted position: second hitch means carried by said tongue portion and connected to said first hitch means on said first vehicle for pivotally connecting the converter dolly to said first vehicle about a first substantially vertical axis; ground engaging wheels carried by said frame; a fifth wheel fixed on said base portion of said frame having a longitudinal slot formed therein and adjacent to its front end and receiving the second vehicle kingpin to interconnect said converter dolly to said second vehicle to permit pivotal movement of the second vehicle relative to said dolly about a second substantially vertical axis; and length locking means cooperating with said inner shaft and said outer shaft, said length locking means located within a length locking pin housing connected to said converter dolly, a length locking pin positioned in said housing and moveable therein from a retracted to an extended position, and length locking motor means operatively connected to said housing and cooperating with said length locking pin to move said length locking pin between a retracted position for permitting movement of said inner shaft within said outer shaft and an extended position in engagement with said inner shaft for preventing movement of said inner shaft within said outer shaft, said length locking motor means further includes a spring means operatively connected to said length locking pin for maintaining said length locking pin in said extended position when no power is being applied to said length locking motor means; whereby said inner shaft may be locked in its retracted position to provide improved aerodynamic performance while traveling on highways and locked in its extended position to provide greater maneuverability while traveling on city streets.

7. A tandem trailer assembly according to claim 6 wherein said length locking means further includes a length locking control means operatively connected to said length locking motor means for retracting and extending said length locking pin.

8. A tandem trailer assembly according to claim 6 wherein said length locking motor means comprises a pneumatic system including a diaphragm in communication with an air pressure source.

9. A tandem trailer assembly according to claim 6 further comprising a protection means connected to said converter dolly for preventing damage to said length locking motor means while the tandem trailer assembly is in motion from loose debris or obstacles on the ground.

10. A tandem trailer assembly according to claim 9 wherein said protection means is a substantially vertical plate connected to said outer shaft adjacent said length locking motor means.

11. A tandem trailer assembly according to claim 6 further comprising a travel limit means carried by said converter dolly for preventing said inner shaft from being completely removed from said outer shaft.

12. A tandem trailer assembly according to claim 6 wherein an underside of said inner shaft includes a plurality of longitudinally spaced apertures for receiving said length locking pin when said length locking pin is in an extended position in engagement with said inner shaft for preventing movement of said inner shaft.

13. A converter dolly for connecting a first wheeled vehicle and a second wheeled vehicle, having a kingpin projecting from an underside of the second wheeled vehicle, in tandem comprising a frame including a base portion and a tongue portion extending forwardly from the base portion, said tongue portion comprising a longitudinally extending substantially rigid adjusting member and a mating member longitudinally slidably engaging said adjusting member, a hitch means carried by said mating member for pivotally connecting the converter dolly to the first vehicle about a first substantially vertical axis, ground engaging wheels carried by said frame, such that said converter dolly is free-standing and may interchangeably be used with various wheeled vehicles, a fifth wheel fixed on said base portion of said frame having a longitudinal slot formed therein and adjacent to said fifth wheel front end and receiving the second vehicle kingpin to interconnect the converter dolly to said second vehicle to permit pivotal movement of the second vehicle relative to said dolly about a second substantially vertical axis, and length locking means cooperating with said adjusting member and said mating member for preventing longitudinal movement of said mating member with respect to said adjusting member when said locking means is engaged, said length locking means includes a length locking pin housing connected to the converter dolly, a length locking pin positioned in said housing and moveable therein from a retracted to an extended position, and length locking motor means operatively connected to said housing and cooperating with said length locking pin to move said length locking pin between a retracted position wherein said mating member may be longitudinally slidably located along said adjusting member and an extended position wherein longitudinal movement of said mating member along said adjusting member is prevented, said length locking motor means further includes a spring means operatively connected to said length locking pin for maintaining said length locking pin in said extended position when no power is being applied to said length locking motor means; whereby the distance between said first substantially vertical axis and said second substantially vertical axis can be adjusted to a desired length and then locked.

14. A converter dolly according to claim 13 wherein said length locking means further includes a length locking control means operatively connected to said length locking motor means for retracting and extending said length locking pin.

15. A converter dolly according to claim 13 wherein said length locking motor means comprises a pneumatic system including a diaphragm in communication with an air pressure source.

16. A converter dolly according to claim 13 further comprising a protection means connected to said converter dolly for preventing damage to said length locking means while the converter dolly is in motion from loose debris or obstacles on the ground.

17. A converter dolly according to claim 16 wherein said protection means is a substantially vertical plate connected to said adjusting member adjacent said length locking means.

18. A converter dolly according to claim 13 further comprising a travel limit means carried by said converter dolly for preventing said mating member from being completely removed from said adjusting member.

19. A tandem trailer assembly comprising: a first wheeled vehicle; hitch means carried by a rearmost portion of said first vehicle; a second wheeled trailer vehicle positioned in tandem behind said first vehicle and including a coupling member comprising a kingpin projecting from an underside of said second trailer vehicle; and a converter dolly positioned between and interconnecting said first and second vehicles, said converter dolly comprising a frame including a base portion and a tongue portion extending forwardly from the base portion, said tongue portion having a longitudinally extending outer shaft mounted within said outer shaft, said tongue portion mounted within said outer shaft, said tongue portion further having a first end portion and a second end portion opposite said first end portion wherein the distance between said first end portion and said second end portion is adjustable by longitudinally moving said inner shaft within said outer shaft; length locking means connected to said tongue portion for preventing longitudinal movement of said inner shaft within said outer shaft when said length locking means is engaged; said length locking means including a length locking pin housing connected to said outer shaft, a length locking pin positioned in said housing and moveable therein from a retracted to an extended position, and length locking motor means operatively connected to said housing and cooperating with said length locking pin to move said length locking pin between a retracted position for permitting movement of said inner shaft within said outer shaft and an extended position in engagement with said inner shaft for preventing movement of said inner shaft within said outer shaft, said length locking motor means further includes a spring means operatively connected to said length locking pin for maintaining said length locking pin in said extended position when no power is being applied to said length locking motor means; hitch means carried by said tongue portion and connected to said hitch means on said first vehicle to permit pivotal movement of the dolly relative to said first vehicle about a first substantially vertical axis, ground engaging wheels carried by said frame, a fifth wheel fixed on said base portion of said frame and having a front end defining opposing front corner portions, and comprising a longitudinal slot formed therein and adjacent to its front end and receiving the second trailer vehicle kingpin to interconnect the converter dolly to said second trailer vehicle to permit pivotal movement of the second trailer vehicle relative to said dolly about a second substantially vertical axis, and locking means cooperating with said fifth wheel and with said second wheeled trailer vehicle, said locking means including a spaced pin housing secured at each front corner portion of the fifth wheel so that when the fifth wheel pivots up or down, the housings move as units with fifth wheel, a pin positioned in each housing and movable therein from a retracted to an extended position, and motor means operatively connected to said housing and cooperating with said pins to move them between retracted, inactive positions for permitting free pivotal movement of said second trailer vehicle relative to said dolly about said second substantially vertical axis during normal driving operations and extended, active positions in engagement with said second trailer vehicle during backing up of the tandem trailer assembly to restrain said second trailer vehicle against pivotal movement relative to the dolly whereby said dolly and said second trailer vehicle operate as a non-articulated unit and pivoting is only permitted about said first substantially vertical axis to thereby permit backing up the tandem trailer assembly without the need for disconnecting the first and second vehicles.

20. A tandem trailer assembly according to claim 19 wherein said length locking means further includes a length locking control means operatively connected to said length locking motor means for retracting and extending said length locking pin means.

21. A tandem trailer assembly according to claim 19 wherein said length locking motor means comprises a pneumatic system including a diaphragm in communication with an air pressure source.

22. A tandem trailer assembly according to claim 19 further comprising a protection means connected to said converter dolly for preventing damage to said length locking means while the tandem trailer assembly is in motion from loose debris or obstacles on the ground.

23. A tandem trailer assembly according to claim 22 wherein said protection means is a substantially vertical plate connected to said outer shaft adjacent said length locking means.

24. A tandem trailer assembly according to claim 19 further comprising a travel limit means carried by said converter dolly for preventing said inner shaft from being completely removed from said outer shaft.

* * * * *